(12) United States Patent
Tzeng (10) Patent No.: US 9,276,455 B2
(45) Date of Patent: Mar. 1, 2016

(54) MAGNETIC RELUCTANCE DEVICE

(71) Applicant: Yuan-Kwei Tzeng, Miaoli (TW)

(72) Inventor: Yuan-Kwei Tzeng, Miaoli (TW)

( * ) Notice: Subject to any disclaimer, the term of this patent is extended or adjusted under 35 U.S.C. 154(b) by 168 days.

(21) Appl. No.: 14/247,717

(22) Filed: Apr. 8, 2014

(65) Prior Publication Data

US 2015/0288272 A1 Oct. 8, 2015

(51) Int. Cl.
*G01D 5/06* (2006.01)
*H02K 49/04* (2006.01)
*H02K 7/18* (2006.01)
*A63B 1/00* (2006.01)

(52) U.S. Cl.
CPC ............... *H02K 49/043* (2013.01); *A63B 1/00* (2013.01); *H02K 7/1861* (2013.01)

(58) Field of Classification Search
CPC .......... G01R 33/07; G01R 33/12; H02K 5/50; H02K 5/02; H02K 5/04; H02K 5/24; H02K 5/26; A63B 21/00; A63B 21/00029; A63B 21/00032; A63B 21/00036; A63B 21/00058; A63B 21/00061; A63B 21/00065; A63B 21/00069; A63B 21/00076; A63B 21/00192; A63B 21/0056; G01D 5/12; G01D 5/22; G01N 27/72; H02N 2/00; H02N 2/147; H02N 2/02; H02N 2/0095; G02B 7/102
See application file for complete search history.

(56) References Cited

U.S. PATENT DOCUMENTS

| | | | |
|---|---|---|---|
| 2002/0043880 A1* | 4/2002 | Suzuki | H02K 7/06 310/12.14 |
| 2012/0019082 A1* | 1/2012 | Won | H02K 5/1732 310/49.01 |

\* cited by examiner

*Primary Examiner* — Son Le
(74) *Attorney, Agent, or Firm* — Muncy, Geissler, Olds & Lowe, P.C.

(57) ABSTRACT

A magnetic reluctance device includes a casing, an inner pipe, a lead screw, a magnet, at least a protruding unit, and at least a metallic element. The magnetic reluctance device is advantageously characterized in that, at least a protruding unit protrudingly disposed on the inner wall surface of an inner pipe moves along a thread of a lead screw, and thus the lead screw slides and drives the inner pipe to rotate, such that it is convenient for a magnet to produce a magnetic drag between the metallic element and the metallic pipe of the casing. The magnetic reluctance device further includes an adjustment unit for altering the distance between the metallic element and the magnet to thereby conveniently alter the strength of the magnetic drag produced between the magnet, the metallic element, and the metallic pipe of the casing while the magnet is rotating.

6 Claims, 10 Drawing Sheets

MAGNETIC RELUCTANCE DEVICE

FIELD OF THE INVENTION

The present invention relates to magnetic reluctance devices, and more particularly, to a magnetic reluctance device for producing a magnetic drag.

BACKGROUND OF THE INVENTION

In general, conventional fitness equipment increases and decreases the weight imposed on and perceived by users mostly by increasing and decreasing metallic weights, respectively. However, during the operation of the fitness equipment, frequent collision of the metallic weights and related components not only causes damage thereto and the related components but also adds to the maintenance costs of the fitness equipment.

In recent years, due to the development of magnetic reluctance devices, magnetic reluctance devices are applied to motors and fitness equipment. The fitness equipment equipped with magnetic reluctance devices not only enables users to perceive a weight by means of a magnetic drag, but also overcome the aforesaid drawback of the prior art, that is, frequent collision of conventional fitness equipment components. Nonetheless, conventional magnetic reluctance devices which produce a magnetic drag is not only structurally complicated but also disadvantaged by a drawback, that is, it is rather inconvenient to adjust the strength of the magnetic drag produced by the magnetic reluctance devices.

SUMMARY OF THE INVENTION

In view of the aforesaid drawbacks of the prior art, it is an objective of the present invention to provide a magnetic reluctance device which is structurally simple and conducive to convenient production of a magnetic drag.

Another objective of the present invention is to provide a magnetic reluctance device conducive to convenient adjustment of the strength of the magnetic drag produced.

In order to achieve the above and other objectives, the present invention provides a magnetic reluctance device which comprises a casing, an inner pipe, a lead screw, a magnet, at least a protruding unit, and at least a metallic element. The casing comprises a metallic pipe, a first cover and a second cover. The metallic pipe has a first end and a second end. The first cover is disposed at the first end of the metallic pipe and has a penetrating hole. The second cover is disposed at the second end of the metallic pipe. The inner pipe is rotatably disposed in the casing. The lead screw is slidably disposed in the inner pipe and penetrates the penetrating hole. The magnet is disposed on the outer wall surface of the inner pipe. The at least a protruding unit is protrudingly disposed on the inner wall surface of the inner pipe. The at least a protruding unit abuts against the thread of the lead screw. The at least a metallic element is disposed in the metallic pipe and positioned proximate to the magnet.

As regards the magnetic reluctance device, the metallic pipe comprises at least a through hole. The at least a through hole is disposed on the lateral wall surface of the metallic pipe. The metallic element is circumferentially disposed in the metallic pipe. The magnetic reluctance device further comprises an adjustment unit. The adjustment unit is slidably disposed in the casing. The adjustment unit is connected to the metallic element so as to drive the metallic element to slide relative to the metallic pipe. The position of the adjustment unit relative to the metallic pipe is fixed by means of the at least a through hole.

As regards the magnetic reluctance device, the metallic element is disposed on the inner wall surface of the metallic pipe. The adjustment unit protrudes from the metallic pipe through the through hole. A plurality of engaging portions are disposed at the rim of the through hole of the metallic pipe and spaced apart from each other. The adjustment unit is engaged with and thus fixed to one of the engaging portions.

As regards the magnetic reluctance device, the metallic pipe has a plurality of through holes which are spaced apart from each other. The metallic element is circumferentially disposed on the outer wall surface of the metallic pipe. The adjustment unit is engaged with and thus fixed to one of the through holes.

As regards the magnetic reluctance device, the at least a protruding unit is an inner thread or a stud.

As regards the magnetic reluctance device, the at least a protruding unit comprises a post, a spring and a steel ball. The post has an installation slot. The installation slot opens toward the interior of the inner pipe. The spring is disposed in the installation slot. The steel ball is disposed between the spring and the thread of the lead screw.

The magnetic reluctance device further comprises a coil set fixedly disposed in the casing and positioned proximate to the magnet.

Accordingly, the magnetic reluctance device of the present invention is advantageously characterized in that: at least a protruding unit protrudingly disposed on the inner wall surface of an inner pipe moves along a thread of a lead screw, and thus the lead screw slides and drives the inner pipe to rotate, such that it is convenient for a magnet to produce a magnetic drag between the metallic element and the metallic pipe of the casing. The magnetic reluctance device of the present invention further comprises an adjustment unit for altering the distance between the metallic element and the magnet to thereby conveniently alter the strength of the magnetic drag produced between the magnet, the metallic element, and the metallic pipe of the casing while the magnet is rotating.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
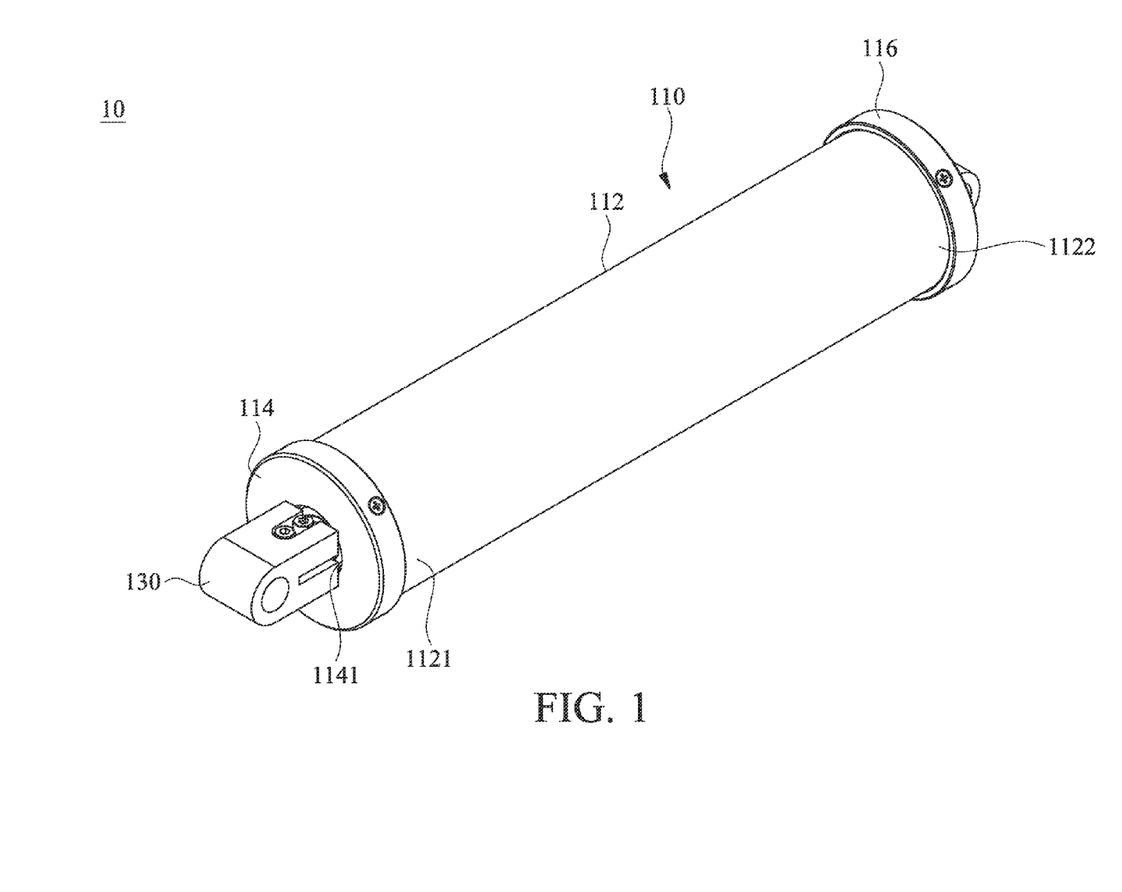
FIG. 1 is a schematic perspective view of a magnetic reluctance device according to the first embodiment of the present invention.
Figure 2:
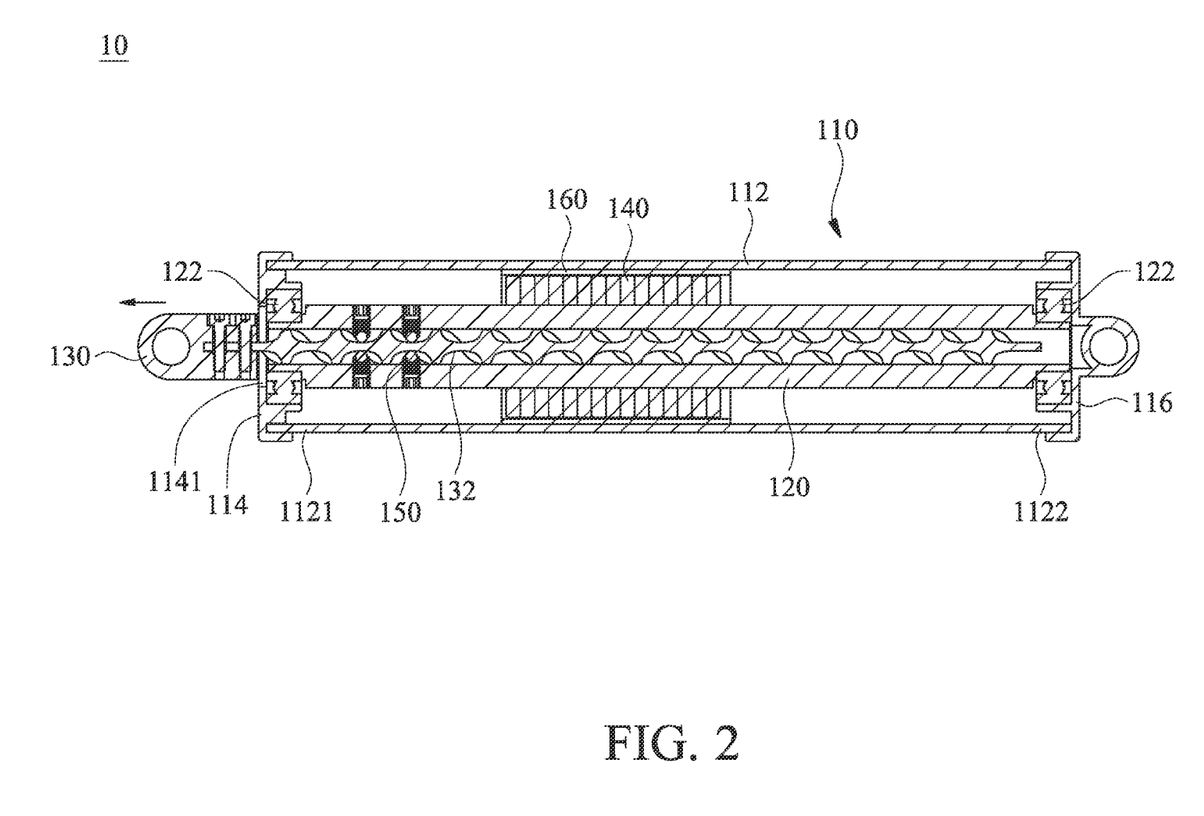
FIG. 2 is a schematic cross-sectional view of the magnetic reluctance device according to the first embodiment of the present invention.

Referring to FIG. 1 and FIG. 2, there are shown in FIG. 1 a schematic perspective view of a magnetic reluctance device 10 according to the first embodiment of the present invention, and in FIG. 2 a schematic cross-sectional view of the magnetic reluctance device 10 according to the first embodiment of the present invention. As shown in the diagrams, the magnetic reluctance device 10 of the present invention comprises a casing 110, an inner pipe 120, a lead screw 130, a magnet 140, at least a protruding unit 150, and at least a metallic element 160.

The casing 110 comprises a metallic pipe 112, a first cover 114 and a second cover 116. The metallic pipe 112 has a first end 1121 and a second end 1122. The first cover 114 is disposed at the first end 1121 of the metallic pipe 112 and comprises a penetrating hole 1141. The second cover 116 is disposed at the second end 1122 of the metallic pipe 112.

The inner pipe 120 is rotatably disposed in the casing 110. In this embodiment, the two ends of the inner pipe 120 are disposed at the first cover 114 and the second cover 116, respectively, through a bearing 122 each, to allow the inner pipe 120 to rotate relative to the first cover 114 and the second cover 116.

The lead screw 130 is slidably disposed in the inner pipe 120 and penetrates the penetrating hole 1141, such that one end of the lead screw 130 protrudes from the first cover 114.

The magnet 140 is disposed on the outer wall surface of the inner pipe 120. The magnet 140 is shorter than the inner pipe 120 and is centered at the inner pipe 120.

The at least a protruding unit 150 is protrudingly disposed on the inner wall surface of the inner pipe 120 and abuts against a thread 132 of the lead screw 130.

The at least a metallic element 160 is disposed in the metallic pipe 112 and positioned proximate to the magnet 140. In this embodiment, the at least a metallic element 160 is annular and fixedly disposed in the metallic pipe 112.

The metallic pipe 112 is made of iron so as to be magnetically permeable. The at least a metallic element 160 is made of aluminum or copper so as to produce an eddy current.

Specifically speaking, one end of the lead screw 130 protrudes from the penetrating hole 1141 and is gripped and pulled by a user, such that the lead screw 130 slides relative to the inner pipe 120; meanwhile, the at least a protruding unit 150 protrudingly disposed on the inner wall surface of the inner pipe 120 moves along the thread 132 of the lead screw 130, thereby driving the inner pipe 120 to rotate relative to the casing 110. Hence, the at least a protruding unit 150 and the thread 132 of the lead screw 130 together convert the linear motion of the lead screw 130 into the rotational motion of the inner pipe 120, and in consequence the magnet 140 disposed on the outer wall surface of the inner pipe 120 rotates relative to the at least a metallic element 160 and the metallic pipe 112 to thereby generate an eddy current at the at least a metallic element 160. Furthermore, with the metallic pipe 112 being magnetically permeable, a magnetic drag is generated between the magnet 140, the at least a metallic element 160, and the metallic pipe 112. The magnetic drag obstructs the rotation of the magnet 140 and thus opposes the sliding of the lead screw 130, such that the user perceives a load when pulling and pushing the lead screw 130.

Accordingly, the magnetic reluctance device 10 of the present invention is structurally simple and advantageously characterized by the conversion of the linear motion of the lead screw 130 into the rotational motion of the inner pipe 120, the generation of the magnetic drag between the magnet 140, the at least a metallic element 160, and the metallic pipe 112 of the casing 110, and the user's perception of a load when pulling and pushing the lead screw 130.

Figure 3:
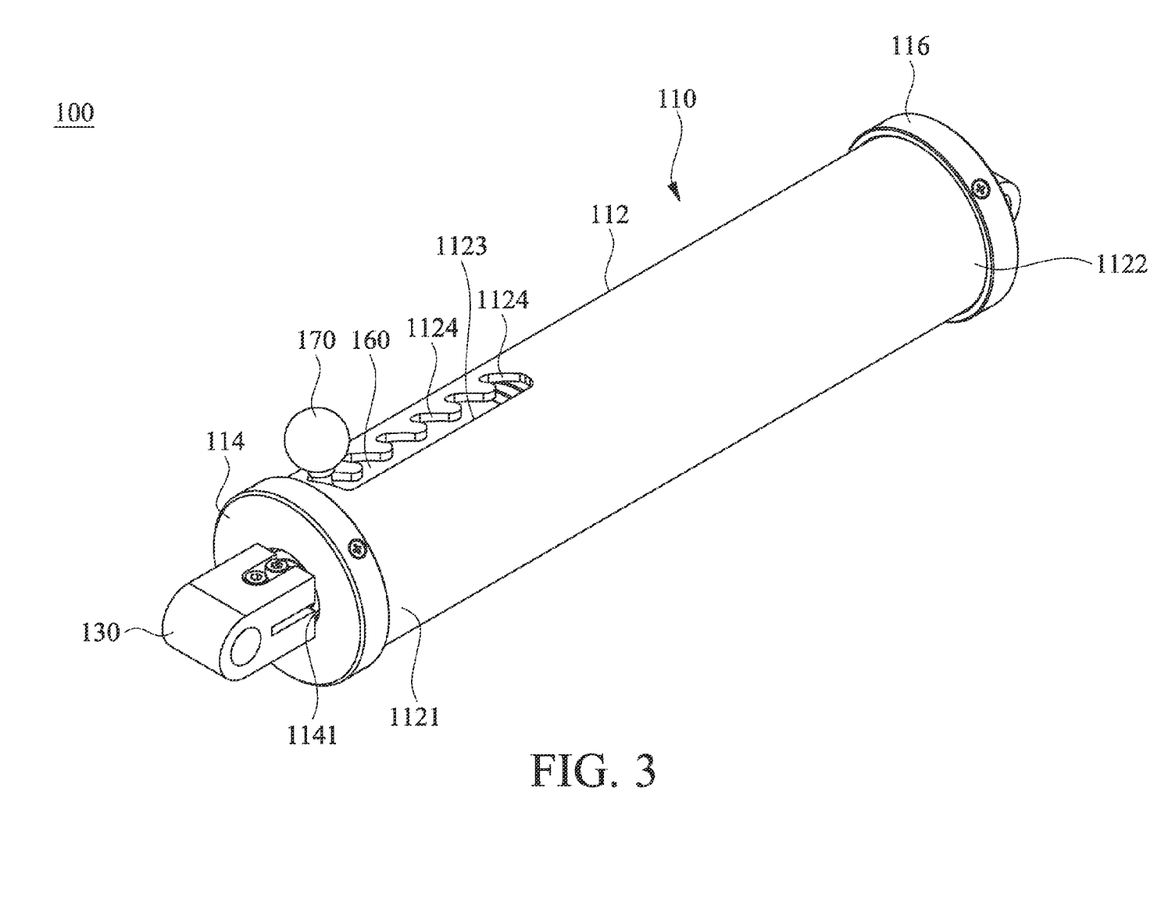
FIG. 3 is a schematic perspective view of a magnetic reluctance device according to the second embodiment of the present invention.
Figure 4:
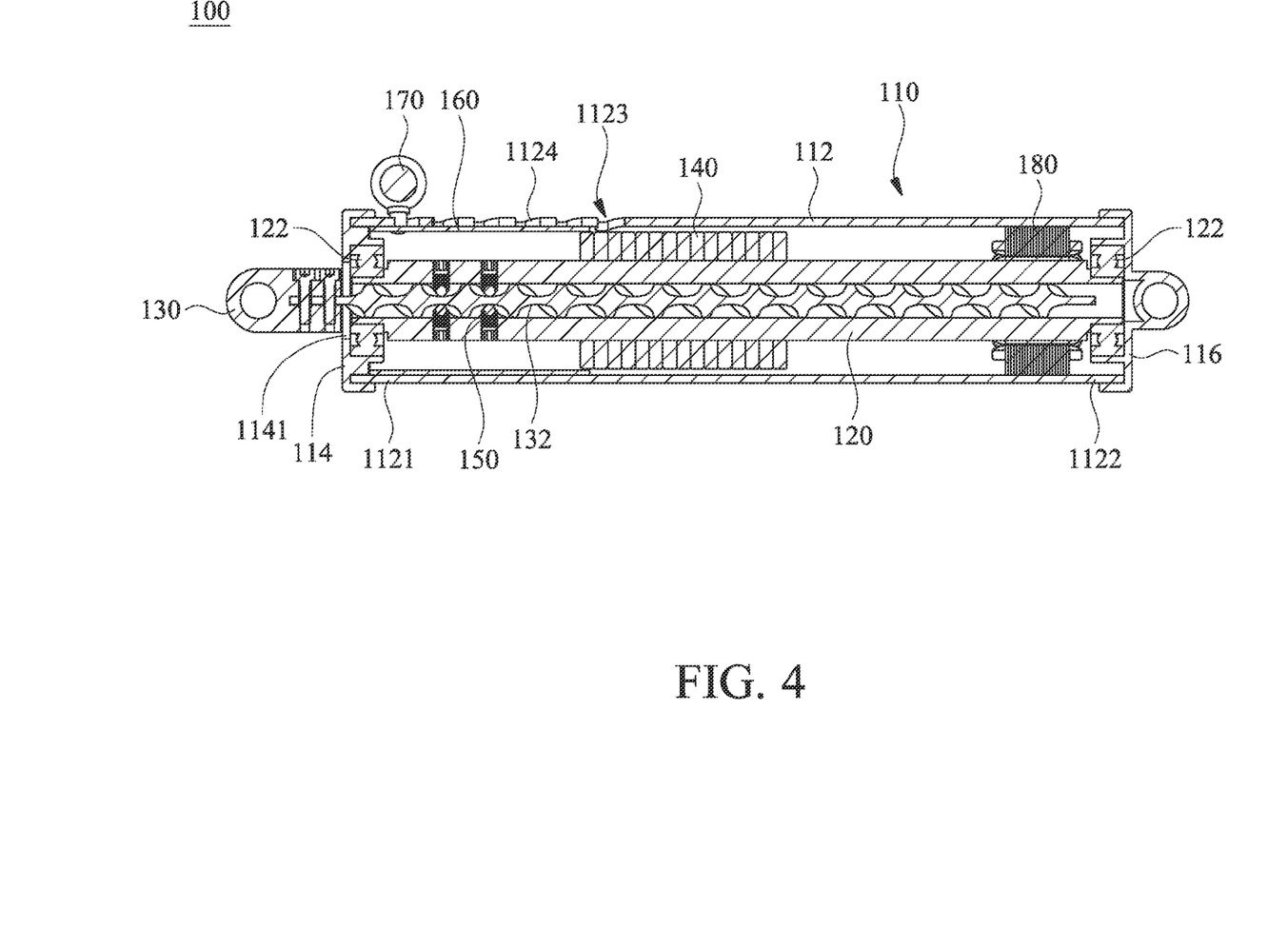
FIG. 4 is a schematic cross-sectional view of the magnetic reluctance device according to the second embodiment of the present invention.
Figure 5:
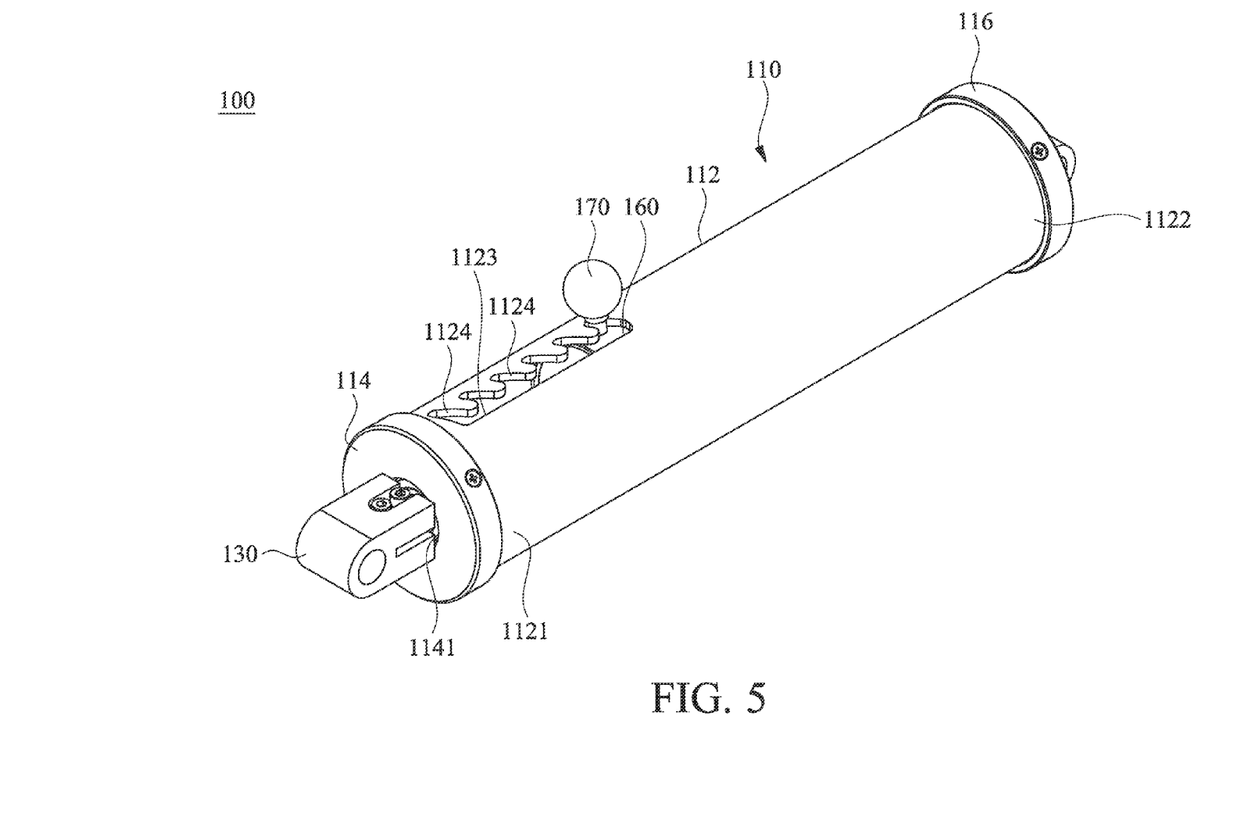
FIG. 5 is another schematic perspective view of the magnetic reluctance device according to the second embodiment of the present invention.
Figure 6:
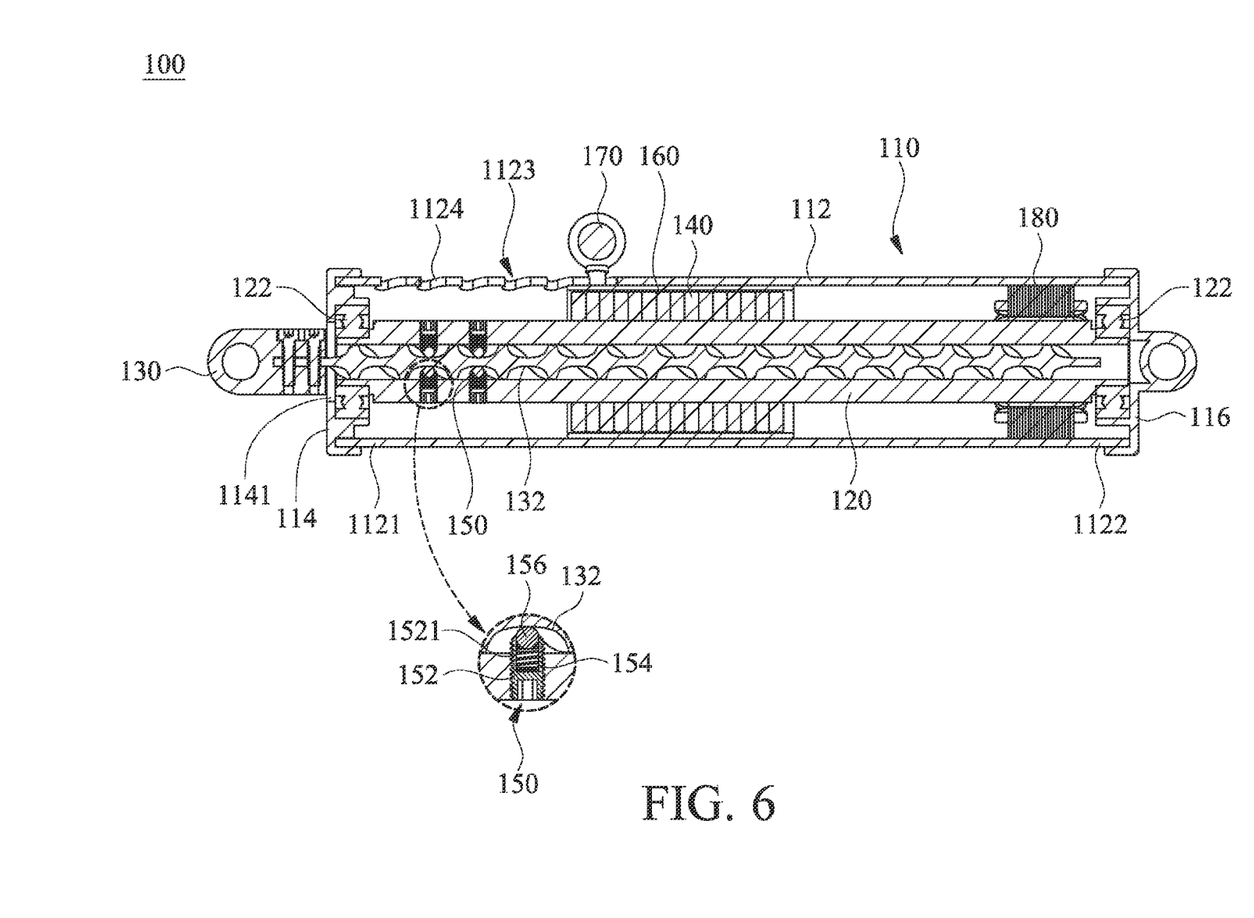
FIG. 6 is another schematic cross-sectional view of the magnetic reluctance device according to the second embodiment of the present invention.

Referring to FIG. 3 through FIG. 6, there are shown in FIG. 3 a schematic perspective view of a magnetic reluctance device 100 according to the second embodiment of the present invention, in FIG. 4 a schematic cross-sectional view of the magnetic reluctance device 100 according to the second embodiment of the present invention, in FIG. 5 another schematic perspective view of the magnetic reluctance device 100 according to the second embodiment of the present invention, and in FIG. 6 another schematic cross-sectional view of the magnetic reluctance device 100 according to the second embodiment of the present invention. As shown in the diagrams, the magnetic reluctance device 100 of the present invention comprises a casing 110, an inner pipe 120, a lead screw 130, a magnet 140, at least a protruding unit 150, at least a metallic element 160, and an adjustment unit 170.

The casing 110 comprises a metallic pipe 112, a first cover 114, and a second cover 116. The metallic pipe 112 has a first end 1121, a second end 1122, and a through hole 1123. The through hole 1123 is disposed on the lateral wall surface of the metallic pipe 112. The first cover 114 is disposed at the first end 1121 of the metallic pipe 112 and comprises a penetrating hole 1141. The second cover 116 is disposed at the second end 1122 of the metallic pipe 112.

The inner pipe 120 is rotatably disposed in the casing 110. In this embodiment, the two ends of the inner pipe 120 are disposed at the first cover 114 and the second cover 116, respectively, through a bearing 122 each, to allow the inner pipe 120 to rotate relative to the first cover 114 and the second cover 116.

The lead screw 130 is slidably disposed in the inner pipe 120 and penetrates the penetrating hole 1141, such that one end of the lead screw 130 protrudes from the first cover 114.

The magnet 140 is disposed on the outer wall surface of the inner pipe 120. The magnet 140 is shorter than the inner pipe 120 and is centered at the inner pipe 120.

The at least a protruding unit 150 is protrudingly disposed on the inner wall surface of the inner pipe 120 and abuts against the thread 132 of the lead screw 130.

The at least a metallic element 160 is disposed in the metallic pipe 112 and positioned proximate to the magnet 140. In this embodiment, the at least a metallic element 160 is annular and fixedly disposed in the metallic pipe 112.

The adjustment unit 170 is slidably disposed in the casing 110. The adjustment unit 170 connects with the at least a metallic element 160 to drive the at least a metallic element 160 to slide relative to the metallic pipe 112. Due to the through hole 1123, the position of the adjustment unit 170 relative to the metallic pipe 112 is fixed.

The metallic pipe 112 is made of iron so as to be magnetically permeable. The at least a metallic element 160 is made of aluminum and copper so as to produce an eddy current.

Specifically speaking, one end of the lead screw 130 protrudes from the penetrating hole 1141 and is gripped and pulled by a user, such that the lead screw 130 slides relative to the inner pipe 120; meanwhile, the at least a protruding unit 150 protrudingly disposed on the inner wall surface of the inner pipe 120 moves along the thread 132 of the lead screw 130, thereby driving the inner pipe 120 to rotate relative to the casing 110. Hence, the at least a protruding unit 150 and the thread 132 of the lead screw 130 together convert the linear motion of the lead screw 130 into the rotational motion of the inner pipe 120, and in consequence the magnet 140 disposed on the outer wall surface of the inner pipe 120 rotates relative to the at least a metallic element 160 and the metallic pipe 112 to thereby generate an eddy current at the at least a metallic element 160. Furthermore, with the metallic pipe 112 being magnetically permeable, a magnetic drag is generated between the magnet 140, the at least a metallic element 160, and the metallic pipe 112. The magnetic drag obstructs the rotation of the magnet 140 and thus opposes the sliding of the lead screw 130, such that the user perceives a load when pulling and pushing the lead screw 130.

In this embodiment, the at least a metallic element 160 is disposed on the inner wall surface of the metallic pipe 112, and the adjustment unit 170 protrudes from the metallic pipe 112 through the through hole 1123 of the metallic pipe 112. Engaging portions 1124 are disposed at the rim of the through hole 1123 and spaced apart from each other. The adjustment unit 170 is engaged with one of the engaging portions 1124. The inner diameter of the at least a metallic element 160 is larger than the outer diameter of the inner pipe 120. The at least a metallic element 160 is spaced apart from the inner pipe 120 by a specific distance. Given the aforesaid technical features, the at least a metallic element 160 is slidable relative to the metallic pipe 112 to thereby move and end up between the magnet 140 and the metallic pipe 112.

To adjust the strength of the magnetic drag, the user adjusts the position of the at least a metallic element 160 relative to the magnet 140 with the adjustment unit 170 by moving the adjustment unit 170 within the through hole 1123 to thereby drive the at least a metallic element 160 to slide relative to the metallic pipe 112 and thus alter the magnet 140 area hidden by the at least a metallic element 160. The larger the magnet 140 area hidden by the at least a metallic element 160 (that is, the closer the at least a metallic element 160 is to the magnet 140), the stronger is the magnetic drag generated between the magnet 140, the at least a metallic element 160, and the metallic pipe 112 during the rotation of the magnet 140. Referring to FIG. 3 and FIG. 4, the at least a metallic element 160 is moved until it is positioned outside the magnet 140; at this point in time, the strongest magnetic drag is generated between the magnet 140, the at least a metallic element 160, and the metallic pipe 112. Conversely, the smaller the magnet 140 area hidden by the at least a metallic element 160 (that is, the farther the at least a metallic element 160 is from the magnet 140), the weaker is the magnetic drag generated between the magnet 140, the at least a metallic element 160, and the metallic pipe 112. Accordingly, the magnetic reluctance device 100 of the present invention conveniently alters the strength of the magnetic drag with the adjustment unit 170 and thereby alters the strength of the load perceived by a user while the user is pulling and pushing the lead screw 130, such that the magnetic reluctance device 100 can be applied to a fitness equipment (not shown).

Furthermore, after the adjustment unit 170 has moved within the through hole 1123 and driven the at least a metallic element 160 to move to an intended position, the user can move the adjustment unit 170 toward the rim of the through hole 1123 to cause the adjustment unit 170 to get engaged with a corresponding one of the engaging portions 1124 and thus fix the position of the at least a metallic element 160 relative to the magnet 140, thereby fixing the strength of the magnetic drag generated by the magnetic reluctance device 100.

In this embodiment, the at least a protruding unit 150 comprises a post 152, a spring 154 and a steel ball 156. The post 152 has an installation slot 1521. The installation slot 1521 opens toward the interior of the inner pipe 129. The spring 154 is disposed in the installation slot 1521. The steel ball 156 is disposed between the spring 154 and the thread 132 of the lead screw 130, such that the spring 154 abuts against the steel ball 156 and thus causes the steel ball 156 to abut against the thread 132 of the lead screw 130; hence, in the course of movement of the lead screw 130, the steel ball 156 is always moving along the thread 132 so as to convert the linear motion of the lead screw 130 into the rotational motion of the inner pipe 120. The configuration of the at least a protruding unit 150 is not restricted to this embodiment and the drawings but can be an inner thread or a stud which moves along the thread 132 of the lead screw 130 while the lead screw 130 is sliding, thereby driving the inner pipe 120 to rotate.

In this embodiment, the magnetic reluctance device 100 further comprises a coil set 180. The coil set 180 is fixedly disposed in the casing 110 and positioned proximate to the magnet 140. The magnet 140 is driven by the inner pipe 120 to rotate and thus generate an induced electromotive force within the coil set 180 to thereby produce an induced current, thereby converting a magnetic force into electric power. A connection cable (not shown) is connected between the coil set 180 and an external device (not shown), such that the magnetic reluctance device 100 serves as a power source for supplying electric power to the external device. In the situation where the magnetic reluctance device 100 is applied to a fitness equipment (not shown), the external device functions as a display unit for use with the fitness equipment. The display unit displays data related to the fitness equipment.

Figure 7:
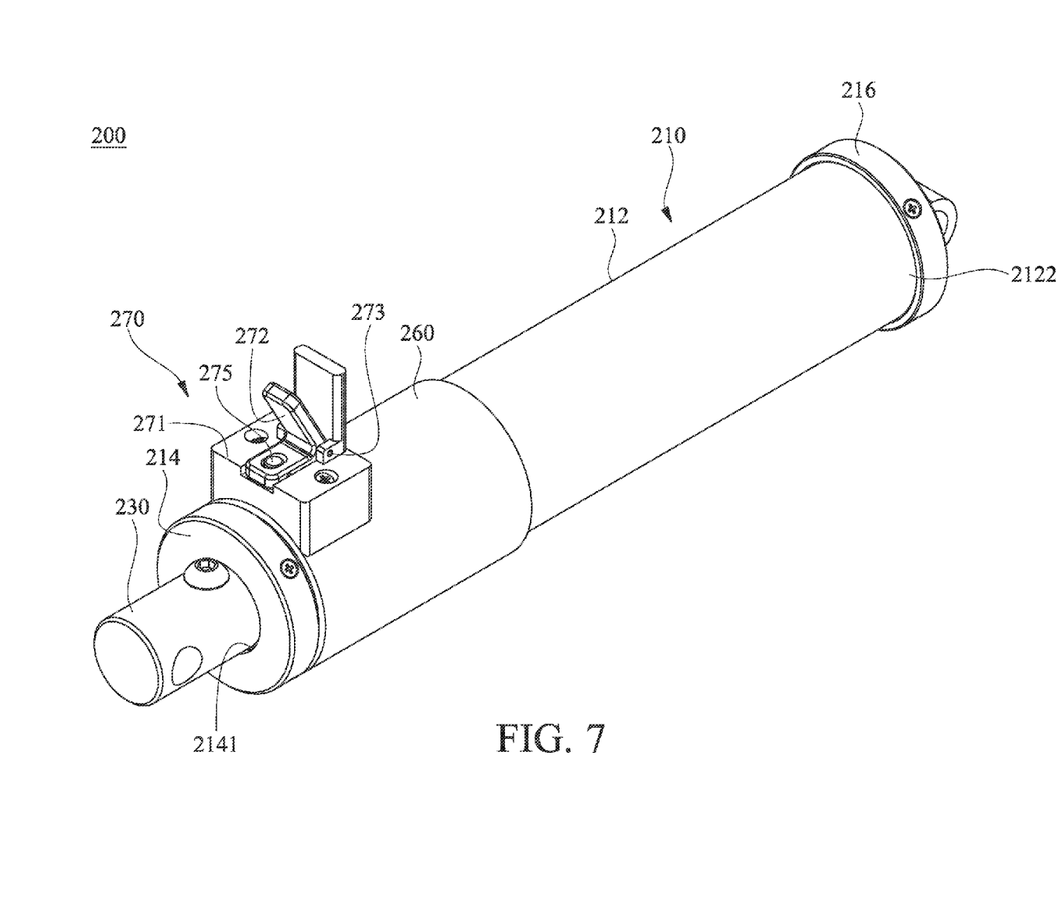
FIG. 7 is a schematic perspective view of a magnetic reluctance device according to the third embodiment of the present invention.
Figure 8:
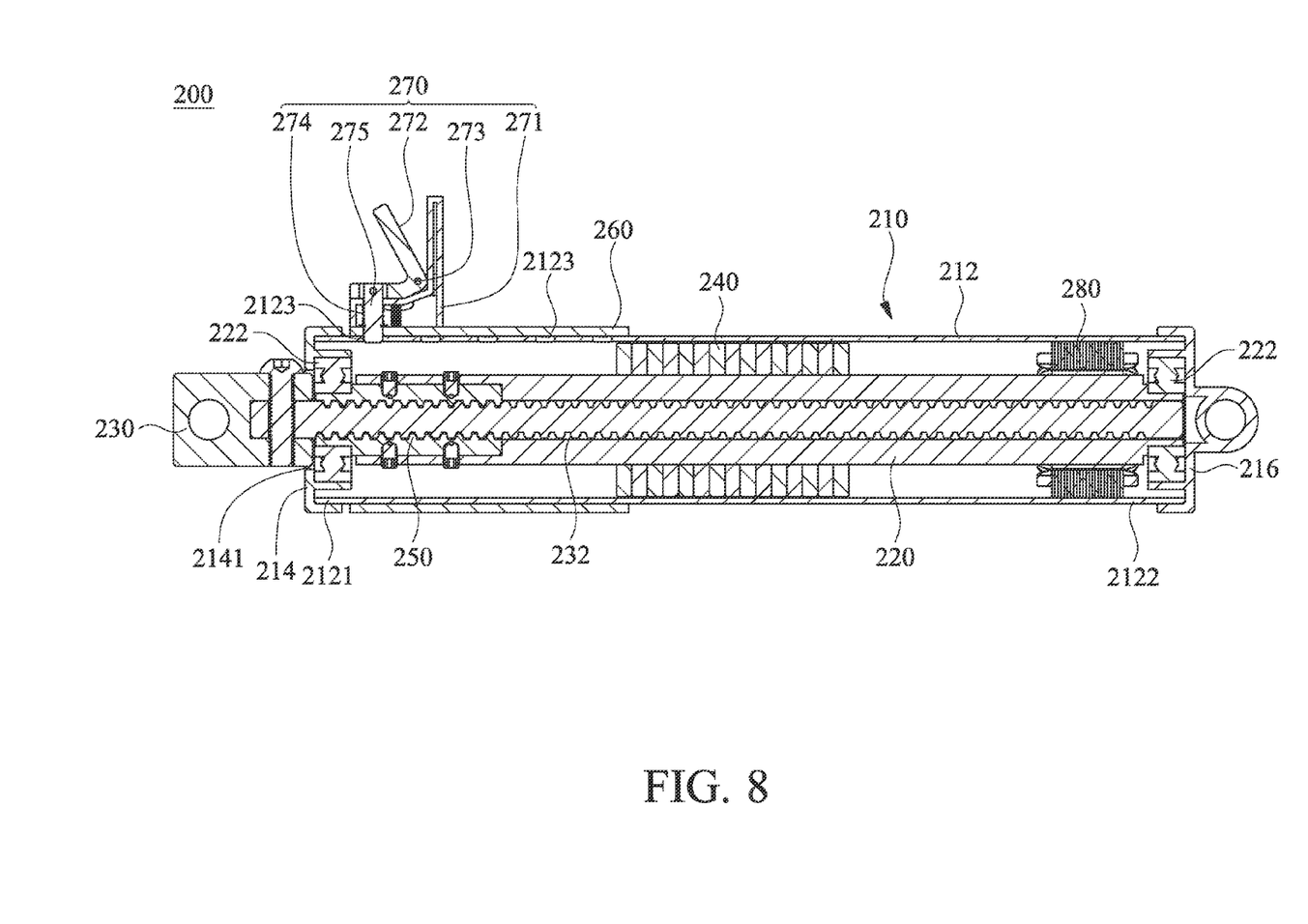
FIG. 8 is a schematic cross-sectional view of the magnetic reluctance device according to the third embodiment of the present invention.
Figure 9:
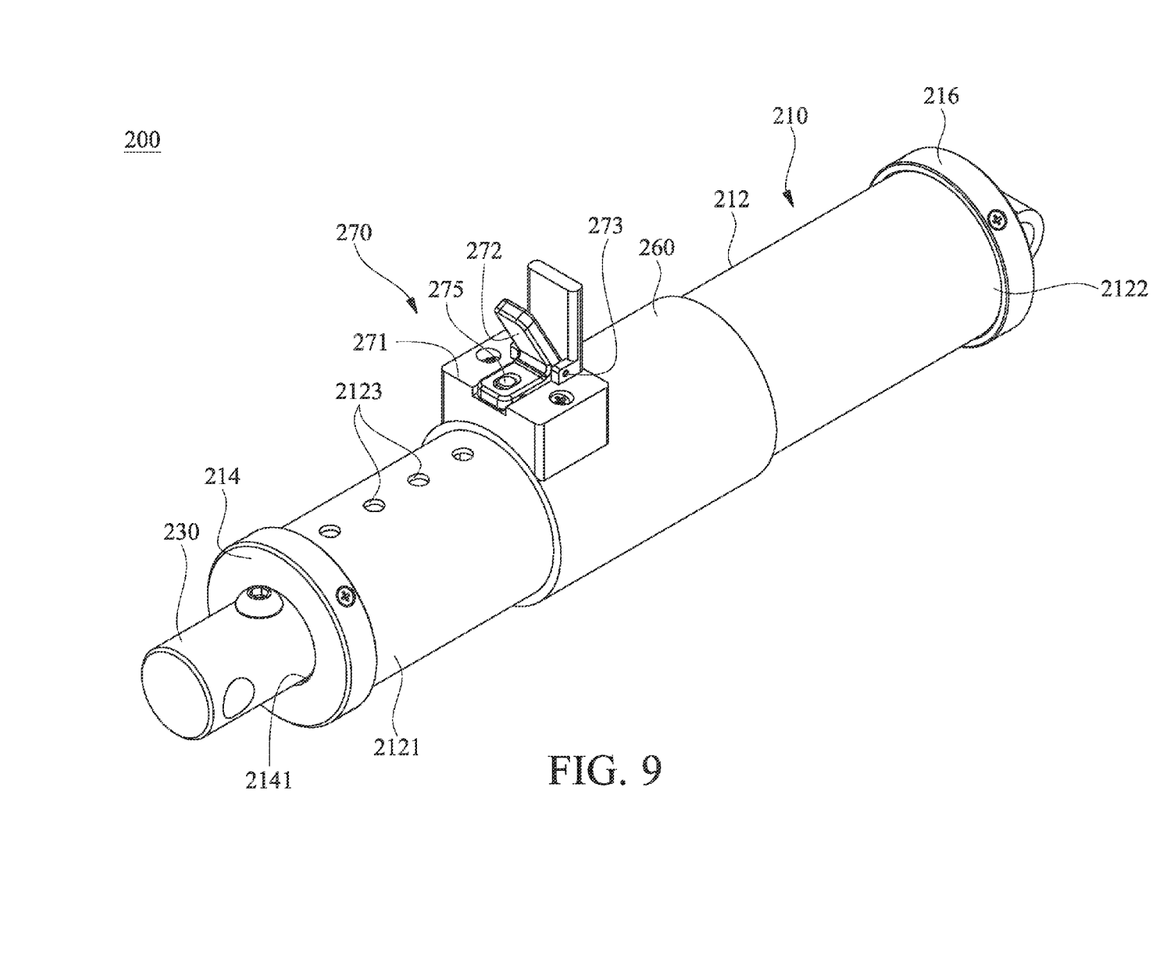
FIG. 9 is another schematic perspective view of the magnetic reluctance device according to the third embodiment of the present invention.
Figure 10:
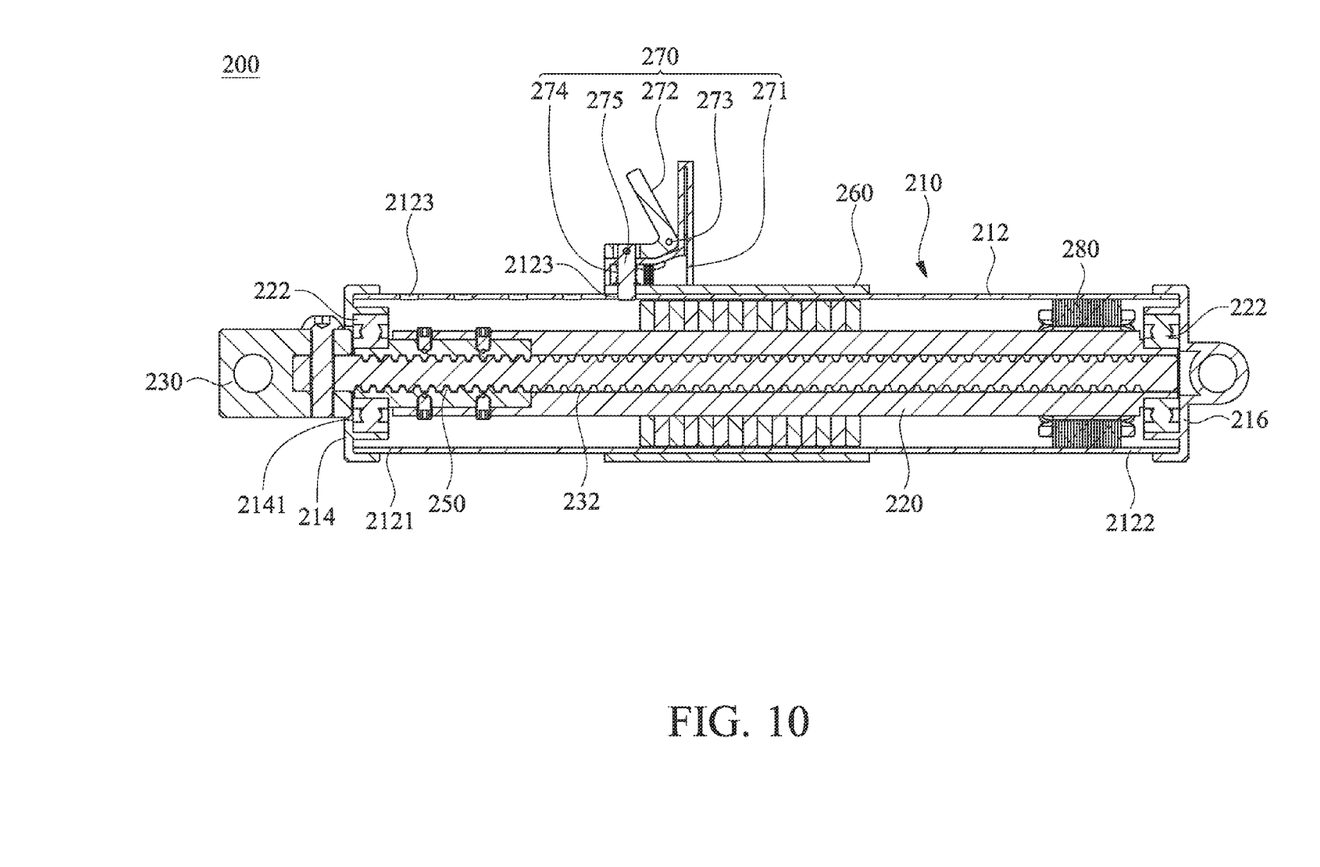
FIG. 10 is another schematic cross-sectional view of the magnetic reluctance device according to the third embodiment of the present invention.

Referring to FIG. 7 through FIG. 10, there are shown in FIG. 7 a schematic perspective view of a magnetic reluctance device 200 according to the third embodiment of the present invention, in FIG. 8 a schematic cross-sectional view of the magnetic reluctance device 200 according to the third embodiment of the present invention, in FIG. 9 another schematic perspective view of the magnetic reluctance device 200 according to the third embodiment of the present invention, and in FIG. 10 another schematic cross-sectional view of the magnetic reluctance device 200 according to the third embodiment of the present invention. As shown in the diagrams, the magnetic reluctance device 200 of the present invention comprises a casing 210, an inner pipe 220, a lead screw 230, a magnet 240, at least a protruding unit 250, a metallic element 260, and an adjustment unit 270.

The casing 210 comprises a metallic pipe 212, a first cover 214, and a second cover 216. The metallic pipe 212 has a first end 2121, a second end 2122, and at least a through hole 2123. The at least a through hole 2123 is disposed on the lateral wall surface of the metallic pipe 212. The first cover 214 is disposed at the first end 2121 of the metallic pipe 212 and comprises a penetrating hole 2141. The second cover 216 is disposed at the second end 2122 of the metallic pipe 212.

The inner pipe 220 is rotatably disposed in the casing 210. In this embodiment, the two ends of the inner pipe 220 are disposed at the first cover 214 and the second cover 216, respectively, through a bearing 222 each, to allow the inner pipe 220 to rotate relative to the first cover 214 and the second cover 216.

The lead screw 230 is slidably disposed in the inner pipe 220 and penetrates the penetrating hole 2141, such that one end of the lead screw 230 protrudes from the first cover 214.

The magnet 240 is disposed on the outer wall surface of the inner pipe 220. The magnet 240 is shorter than the inner pipe 220 and is centered at the inner pipe 220.

The at least a protruding unit 250 is protrudingly disposed on the inner wall surface of the inner pipe 220 and abuts against the thread 232 of the lead screw 230.

The metallic element 260 is disposed in the metallic pipe 212 and positioned proximate to the magnet 240. In this embodiment, the metallic element 260 is annular and disposed outside the metallic pipe 212.

The adjustment unit 270 is slidably disposed in the casing 210. The adjustment unit 270 connects with the metallic element 260 to drive the metallic element 260 to slide relative to the metallic pipe 212. Due to the at least a through hole 2123, the position of the adjustment unit 270 relative to the metallic pipe 212 is fixed.

The metallic pipe 212 is made of aluminum and copper so as to generate an eddy current. The metallic element 260 is made of iron so as to be magnetically permeable.

Specifically speaking, one end of the lead screw 230 protrudes from the penetrating hole 2141 and is gripped and pulled by a user, such that the lead screw 230 slides relative to the inner pipe 220; meanwhile, the at least a protruding unit 250 protrudingly disposed on the inner wall surface of the inner pipe 220 moves along the thread 232 of the lead screw 230, thereby driving the inner pipe 220 to rotate relative to the casing 210. Hence, the at least a protruding unit 250 and the thread 232 of the lead screw 230 together convert the linear motion of the lead screw 230 into the rotational motion of the inner pipe 220, and in consequence the magnet 240 disposed on the outer wall surface of the inner pipe 220 rotates relative the metallic pipe 212 and the metallic element 260 to thereby generate an eddy current at the metallic pipe 212. Furthermore, with the metallic element 260 being magnetically permeable, a magnetic drag is generated between the magnet 240, the metallic pipe 212, and the metallic element 260. The magnetic drag obstructs the rotation of the magnet 240 and thus opposes the sliding of the lead screw 230, such that the user perceives a load when pulling and pushing the lead screw 230.

In this embodiment, the metallic pipe 212 comprises through holes 2123 spaced apart from each other, and the metallic element 260 is circumferentially disposed on the outer wall surface of the metallic pipe 212. The adjustment unit 270 is engaged with one of the through holes 2123. The through holes 2123 are arranged in the axial direction of the metallic pipe 212. The adjustment unit 270 comprises a supporting portion 271, a pressing portion 272, an axle 273, a spring 274, and a positioning portion 275. The supporting portion 271 is fixed to the outer wall surface of the metallic element 260. The axle 273 of the pressing portion 272 is pivotally coupled to the supporting portion 271 and connected to the positioning portion 275. The spring 274 is connected between the supporting portion 271 and the positioning portion 275. The positioning portion 275 is engaged with and thus fixed to one of the through holes 2123. The rotation of the pressing portion 272 about the axle 273 and relative to the supporting portion 271 causes the pressing portion 272 to drive the positioning portion 275 to move until the positioning portion 275 separates from the through holes 2123.

To adjust the strength of the magnetic drag, the user adjusts the position of the metallic element 260 relative to the magnet 240 with the adjustment unit 270 by following the steps as follows: applying a force to the pressing portion 272 to cause the positioning portion 275 to separate from the through holes 2123; and moving the adjustment unit 270 and thus driving the metallic element 260 to slide relative to the metallic pipe 212, thereby altering the magnet 240 area hidden by the metallic element 260. The larger the magnet 240 area hidden by the metallic element 260 (that is, the closer the metallic element 260 is to the magnet 240), the stronger the magnetic drag generated between the magnet 240, the metallic pipe 212, and the metallic element 260 during the rotation of the magnet 240. Referring to FIG. 7 and FIG. 8, the metallic element 260 moves until it is positioned outside the magnet 240 such that, at this point in time, the strongest magnetic drag is generated between the magnet 240, the metallic pipe 212, and the metallic element 260. Conversely, the smaller the magnet 240 area hidden by the metallic element 260 (that is, the farther the metallic element 260 is from the magnet 240), the weaker the magnetic drag generated between the magnet 240, the metallic pipe 212, and the metallic element 260. Accordingly, the magnetic reluctance device 200 of the present invention alters the strength of the magnetic drag conveniently with the adjustment unit 270 and thus alters the strength of the load perceived by the user when pulling and pushing the lead screw 230, thereby allowing the magnetic reluctance device 200 to be applicable to a fitness equipment (not shown).

After the adjustment unit 270 has been moved to drive and move the metallic element 260 to an intended position, the user can release the pressing portion 272 of the adjustment unit 270 such that, under the restoring force of the spring 274, the positioning portion 275 is driven and moved toward the metallic pipe 212 until the positioning portion 275 gets engaged with a corresponding one of the through holes 2123; hence, at this point in time, the position of the metallic element 260 relative to the magnet 240 is fixed, and thus the strength of the magnetic drag generated by the magnetic reluctance device 200 is fixed.

In this embodiment, the at least a protruding unit 250 is an inner thread. The inner thread meshes with the thread 232 of the lead screw 230. Hence, in the course of movement of the lead screw 230, the inner thread keeps moving along the thread 232 so as to convert the linear motion of the lead screw 230 into the rotational movement of the inner pipe 220.

In this embodiment, the magnetic reluctance device 200 further comprises a coil set 280. The coil set 280 is fixedly disposed in the casing 210. When the inner pipe 220 drives the magnet 240 to rotate, an induced electromotive force is generated inside the coil set 280 to produce an induced current, thereby converting a magnetic force into electric power. Hence, a connection cable (not shown) is connected between the coil set 280 and an external device (not shown), and the magnetic reluctance device 200 serves as a power source for supplying electric power to the external device. In the situation where the magnetic reluctance device 200 applies to a fitness equipment (not shown), the external device functions as a display unit for use with the fitness equipment, and the display unit displays data related to the fitness equipment.

In conclusion, the magnetic reluctance device of the present invention is advantageously characterized in that: at least a protruding unit protrudingly disposed on the inner wall surface of an inner pipe moves along a thread of a lead screw, and thus the lead screw slides and drives the inner pipe to rotate, such that it is convenient for a magnet to produce a magnetic drag between the metallic element and the metallic pipe of the casing. The magnetic reluctance device of the present invention further comprises an adjustment unit for altering the distance between the metallic element and the magnet to thereby conveniently alter the strength of the magnetic drag produced between the magnet, the metallic element, and the metallic pipe of the casing while the magnet is rotating.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A magnetic reluctance device, comprising:
a casing comprising a metallic pipe, a first cover, and a second cover, the metallic pipe having a first end and a second end, the first cover being disposed at the first end of the metallic pipe and having a penetrating hole, and the second cover being disposed at the second end of the metallic pipe;
an inner pipe rotatably disposed in the casing;
a lead screw slidably disposed in the inner pipe and penetrating the penetrating hole;
a magnet disposed on an outer wall surface of the inner pipe;
at least a protruding unit protrudingly disposed on an inner wall surface of the inner pipe and abutting against a thread of the lead screw;
at least a metallic element disposed in the metallic pipe and positioned proximate to the magnet; and
an adjustment unit slidably disposed in the casing and connected to the metallic element to drive the metallic element to slide relative to the metallic pipe such that the position of the adjustment unit relative to the metallic pipe is fixed by the at least a through hole, wherein the metallic pipe comprises at least a through hole disposed on a lateral wall surface of the metallic pipe, the metallic element being annular and disposed in the metallic pipe.

2. The magnetic reluctance device of claim 1, wherein the metallic element is disposed on an inner wall surface of the metallic pipe, and the adjustment unit protrudes from the metallic pipe through the through hole, wherein engaging portions are disposed at a rim of the through hole of the metallic pipe and spaced apart from each other so as for the adjustment unit to be engaged with and fixed to one of the engaging portions.

3. The magnetic reluctance device of claim 1, wherein the metallic pipe has through holes spaced apart from each other, and the metallic element is circumferentially disposed on an outer wall surface of the metallic pipe, such that the adjustment unit is engaged with and fixed to one of the through holes.

4. The magnetic reluctance device of claim 1, wherein the at least a protruding unit is one of an inner thread and a stud.

5. The magnetic reluctance device of claim 1, further comprising a coil set fixedly disposed in the casing and positioned proximate to the magnet.

6. A magnetic reluctance device, comprising:
a casing comprising a metallic pipe, a first cover, and a second cover, the metallic pipe having a first end and a second end, the first cover being disposed at the first end of the metallic pipe and having a penetrating hole, and the second cover being disposed at the second end of the metallic pipe;
an inner pipe rotatably disposed in the casing;
a lead screw slidably disposed in the inner pipe and penetrating the penetrating hole;
a magnet disposed on an outer wall surface of the inner pipe;
at least a protruding unit protrudingly disposed on an inner wall surface of the inner pipe and abutting against a thread of the lead screw; and
at least a metallic element disposed in the metallic pipe and positioned proximate to the magnet,
wherein the at least a protruding unit comprises a post, a spring, and a steel ball, the post having an installation slot opening toward an interior of the inner pipe, the spring being disposed in the installation slot, and the steel ball being disposed between the spring and the thread of the lead screw, the protruding unit is always moving along the thread so as to convert the linear motion of the lead screw into the rotational motion of the inner pipe.

* * * * *